(12) United States Patent
Bingham et al.

(10) Patent No.: US 8,021,070 B2
(45) Date of Patent: *Sep. 20, 2011

(54) APPARATUS FOR POSITIONING A COMPONENT OF AN EXERCISE DEVICE

(75) Inventors: Robert J. Bingham, Everett, WA (US); Ryan P. Selby, Palo Alto, CA (US); Neil P. Everson, Woodinville, WA (US); Paul A. Robertson, Bothell, WA (US)

(73) Assignee: LeMond Fitness Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,829

(22) Filed: Dec. 1, 2009

(65) Prior Publication Data

US 2010/0071426 A1    Mar. 25, 2010

Related U.S. Application Data

(63) Continuation of application No. 11/781,182, filed on Jul. 20, 2007, now Pat. No. 7,641,600.

(51) Int. Cl.
*F16B 7/10* (2006.01)
(52) U.S. Cl. .................................................. 403/109.5
(58) Field of Classification Search ................ 403/109.5
See application file for complete search history.

(56) References Cited

U.S. PATENT DOCUMENTS

| | | | |
|---|---|---|---|
| 2,244,351 A | 6/1941 | Venables | |
| 2,849,249 A | 8/1958 | Fridolph | |
| 5,441,470 A | 8/1995 | Chen | |
| 5,591,109 A | 1/1997 | Strnad | |
| 6,612,970 B2 | 9/2003 | Forcillo | |
| 6,669,603 B1 | 12/2003 | Forcillo | |
| 7,806,809 B2 | 10/2010 | Bingham, Jr. et al. | |

OTHER PUBLICATIONS

Equipment description sheet, CYBEX CR350 Recumbent Bike, 2006, Lamar Health Fitness and Sports under license from Cybex International, Inc.
U.S. Appl. No. 12/192,928: Restriction Requirement issued by the USPTO on Oct. 13, 2009, 7 pages.
U.S. Appl. No. 12/192,928: Non-Final office Action issued by the USPTO on Jan. 22, 2010, 13 pages.
U.S. Appl. No. 12/192,928: Notice of Allowance issued by the USPTO on May 28, 2010, 7 pages.
U.S. Appl. No. 12/869,941: Non-final office Action issued by the USPTO on Dec. 27, 2010, 11 pages.

*Primary Examiner* — Victor MacArthur
(74) *Attorney, Agent, or Firm* — Davis Wright Tremaine LLP; George C. Rondeau, Jr.

(57) ABSTRACT

An exercise device including at least one positionable component configured to be positioned by a user. The exercise device includes a frame to which a collar is mounted. The positionable component includes a member that is slidably received within the collar and may be positioned by sliding the member to a selected position. A locking assembly is coupled to the collar and is operable to lock the member in a selected position within the collar, to release the member from the locked position, and when released, to allow the member to slide within the collar. The locking assembly includes a cam pivotably mounted to the collar and a cam follower assembly selectively biased by the cam against a portion of the member disposed inside the collar. The locking assembly also includes a pair of engagement members disposed inside the collar opposite the cam against which the cam biases the member.

20 Claims, 12 Drawing Sheets

US 8,021,070 B2

APPARATUS FOR POSITIONING A COMPONENT OF AN EXERCISE DEVICE

BACKGROUND OF THE INVENTION

1. Field of the Invention

The present invention is directed generally to exercise devices and more particularly to apparatuses for positioning positionable components, such as seats and handlebars, of exercise devices.

2. Description of the Related Art

Many exercise devices, such as stationary bicycles, include a frame upon which adjustably positionable components such as a seat assembly, handlebar assembly, and the like are mounted. Because users of exercise devices come in all shapes and sizes it is often necessary to adjust the position of these components for a particular user. In other words, it is often necessary to customize an exercise device for use by a particular user by selecting a position for each positionable component that is acceptable to the user. Further, because exercise devices are frequently operated in health club or other multiple user settings, the exercise device may be customized between successive users multiple times a day.

Many exercise devices include one or more height adjustment mechanisms that may be used to raise and lower various height adjustable components of the exercise device. For example, an exercise device may include one or more height adjustment mechanisms configured to lock the height adjustable component(s) at an initial height, unlock the height adjustable component allowing a user of the device to move the height adjustable component to a selected different height by raising or lowering the height adjustable component, and subsequently lock the height adjustable component at the selected height. Generally, the height adjustment mechanism is configured to be locked and unlocked by the user. Height adjustment components for a stationary bike typically include seats and handlebars.

Many exercise devices also include other adjustment mechanisms that may be used to modify the position of one or more of the positionable components relative to the frame and one another. For example, a stationary bike may include mechanisms configured to set the forward or rearward position of the seat relative or of the handlebars relative to the frame and to each other.

While exercising, a user can exert a great deal of force on the components of an exercise device. Consequently, height, horizontal and other adjustment mechanisms must prevent the positionable components from moving in response to these forces. In particular, the handlebars and seat of a stationary bike are subjected to substantial twisting and torsion forces as the user moves back and forth while operating the device. Therefore, a need exists for adjustment mechanism operable to position a positionable component of an exercise device and maintain that position of the positionable component during use. A further need exists for adjustment mechanisms that may be easily operated by a user.

BRIEF DESCRIPTION OF THE SEVERAL VIEWS OF THE DRAWING(S)

DETAILED DESCRIPTION OF THE INVENTION

Figure 1:
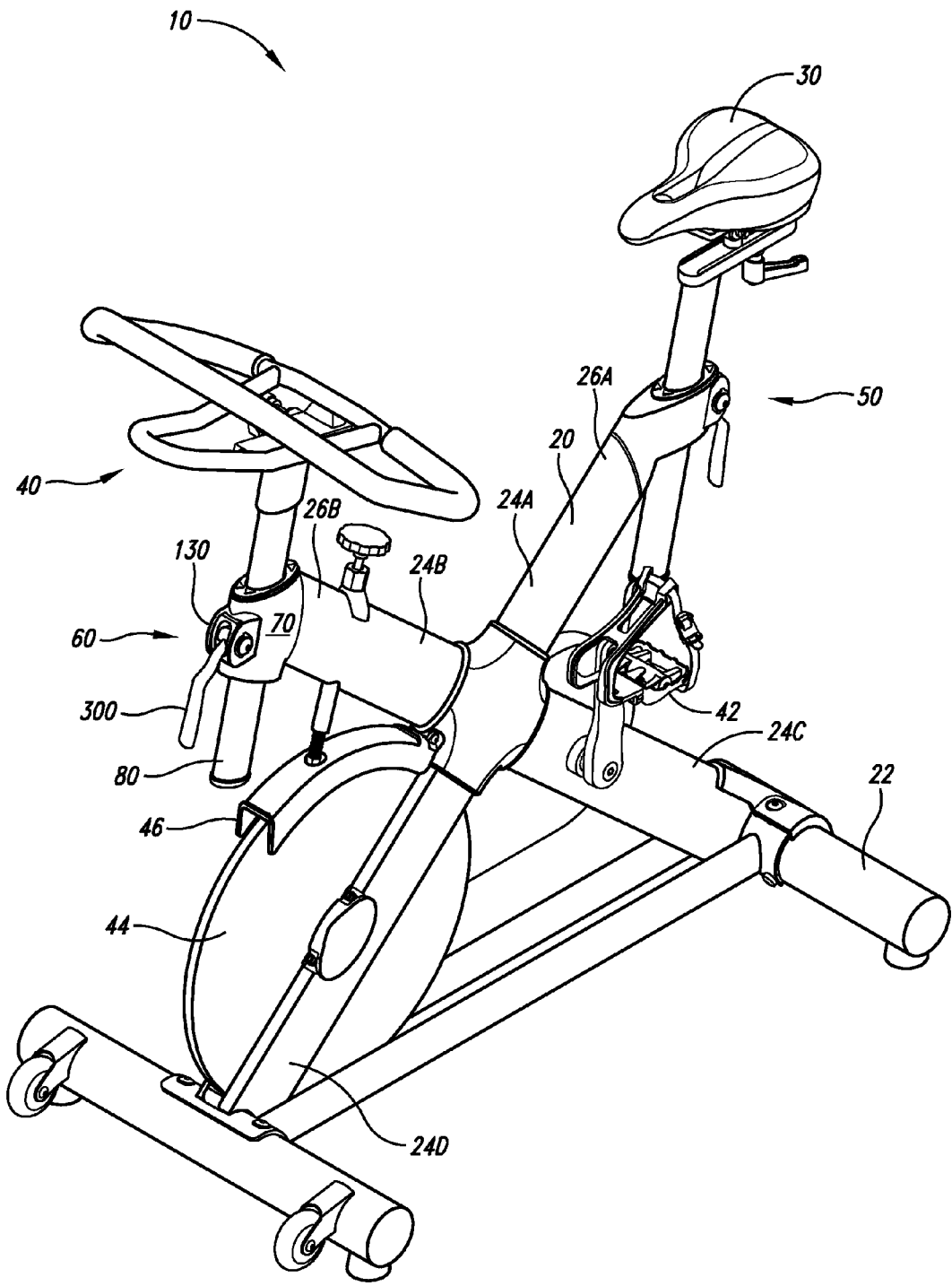
FIG. 1 is a perspective view of an exemplary exercise device incorporating an embodiment of a mounting assembly.

The present invention is illustrated in one embodiment in FIG. 1 in the form of an exercise device 10. The exercise device 10 includes a frame 20 having a base portion 22 disposed for positioning on the ground and supporting a plurality of upwardly extending frame members 24A, 24B, 24C, and 24D. The frame members 24A, 24B, and 24C may be constructed from sections of hollow tubing. One or more positionable components, such as a seat assembly 30, handlebar assembly 40, and the like are mounted to the frame 20. In the embodiment depicted in FIG. 1, the seat assembly 30 is mounted to an open end portion 26A the hollow frame member 24A and the handlebar assembly 40 is mounted to an open end portion 26B of the hollow frame member 24B.

For illustrative purposes only, the exercise device 10 is depicted in the figures as a stationary exercise bike. Therefore, the exercise device 10 depicted includes pedals 42 rotatably mounted to the frame member 24C. The pedals 42 are rotationally coupled to a flywheel or exercise wheel 44 to transfer rotational energy applied to the pedals 42 by the user to the exercise wheel 44. A resistance-producing device 46 is operably coupled to the exercise wheel 44 to provide an adjustable amount of resistance to the rotation of the exercise wheel 44. The user may adjust the resistance-producing device 46 to make the pedals 42 easier or more difficult to turn, thereby decreasing or increasing the amount of effort required to rotate the exercise wheel 44 and correspondingly the amount of effort required to rotate the pedals 42. In this manner, the user may determine the difficulty of his/her workout obtained using the exercise device 10. While the exercise device 10 is depicted in the figures as a stationary exercise bicycle, those of ordinary skill in the art appreciate that other exercise devices such as elliptical exercise machines, treadmills, strength/resistance training equipment, and other type products incorporate positionable components and the present invention is not limited to a particular type of apparatus.

In the embodiment depicted in the drawings, the seat assembly 30 and the handlebar assembly 40 are mounted to the frame 20 using substantially identical mounting assemblies 50 and 60, respectively. Therefore, only the mounting assembly 60 will be described in detail. Further, with the application of ordinary skill in the art, the mounting assembly 60 may be adapted for use with various positionable components without departing from the present invention and such embodiments are within the scope of the present invention. Non-limiting examples of these various positionable components include a seat configured for fore and aft positioning, handlebars configured for fore and aft positioning, electronic devices, such as an electronic display console, and the like.

Mounting Assembly 60

Figure 2:
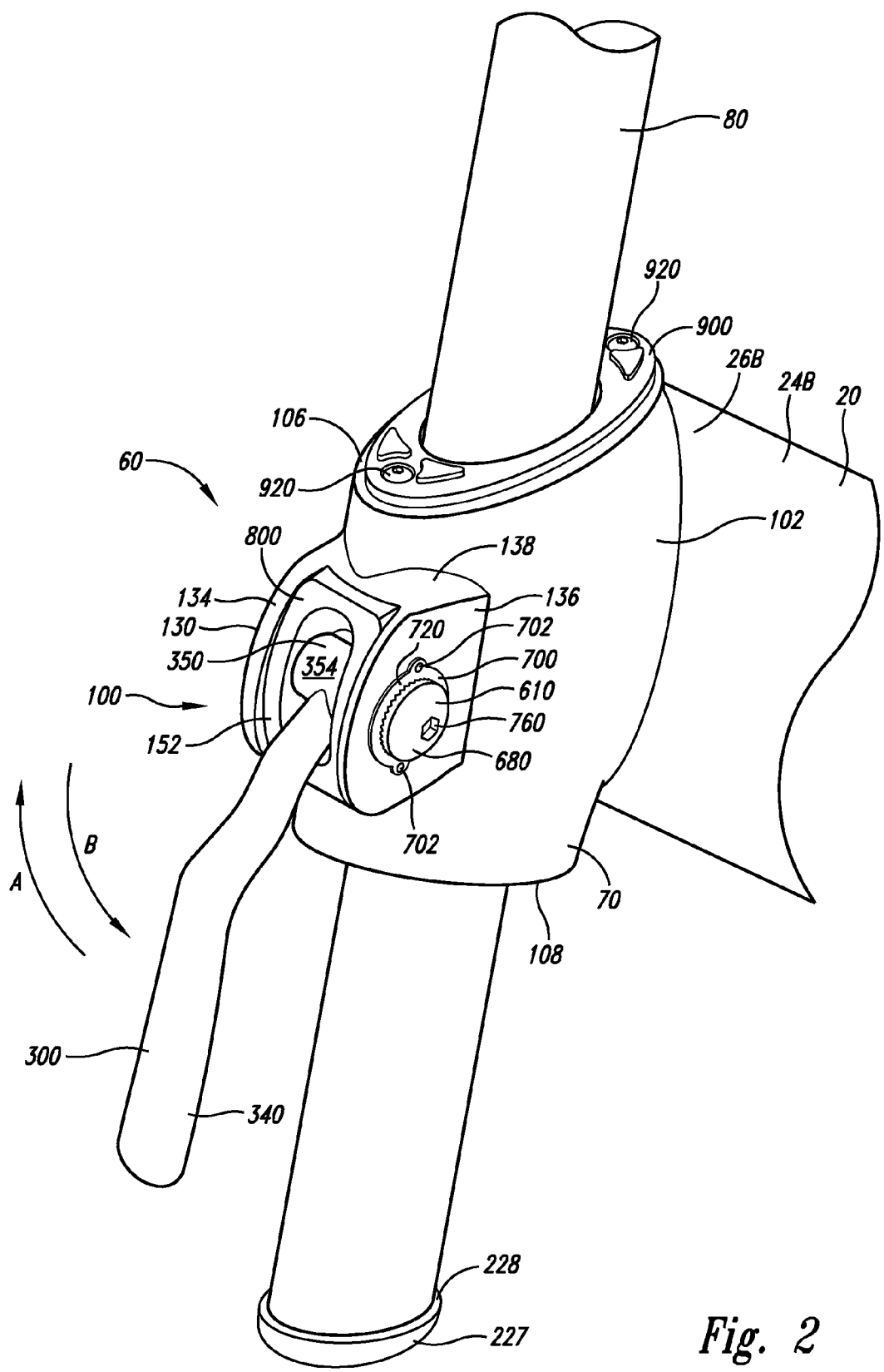
FIG. 2 is an enlarged perspective view of the mounting assembly of FIG. 1.

Referring to FIG. 2, the mounting assembly 60 includes a collar 70, an adjustably movable member 80, and a locking assembly 100. In the embodiment depicted in the figures, the collar 70 is mounted to the frame member 24B of the frame 20 and the member 80 is mounted to the positionable component, which with respect to the mounting assembly 60 is the handlebar assembly 40 (see FIG. 1). As is apparent to those of ordinary skill in the art, in various embodiments, the member 80 may be a component of the positionable component. Those of ordinary skill in the art also appreciate that the member 80 may include a frame member (not shown) and the positionable component may be mounted to the collar 70 and configured to slide along the frame member and such embodiments are within the scope of the present invention.

Collar 70

Figure 3:
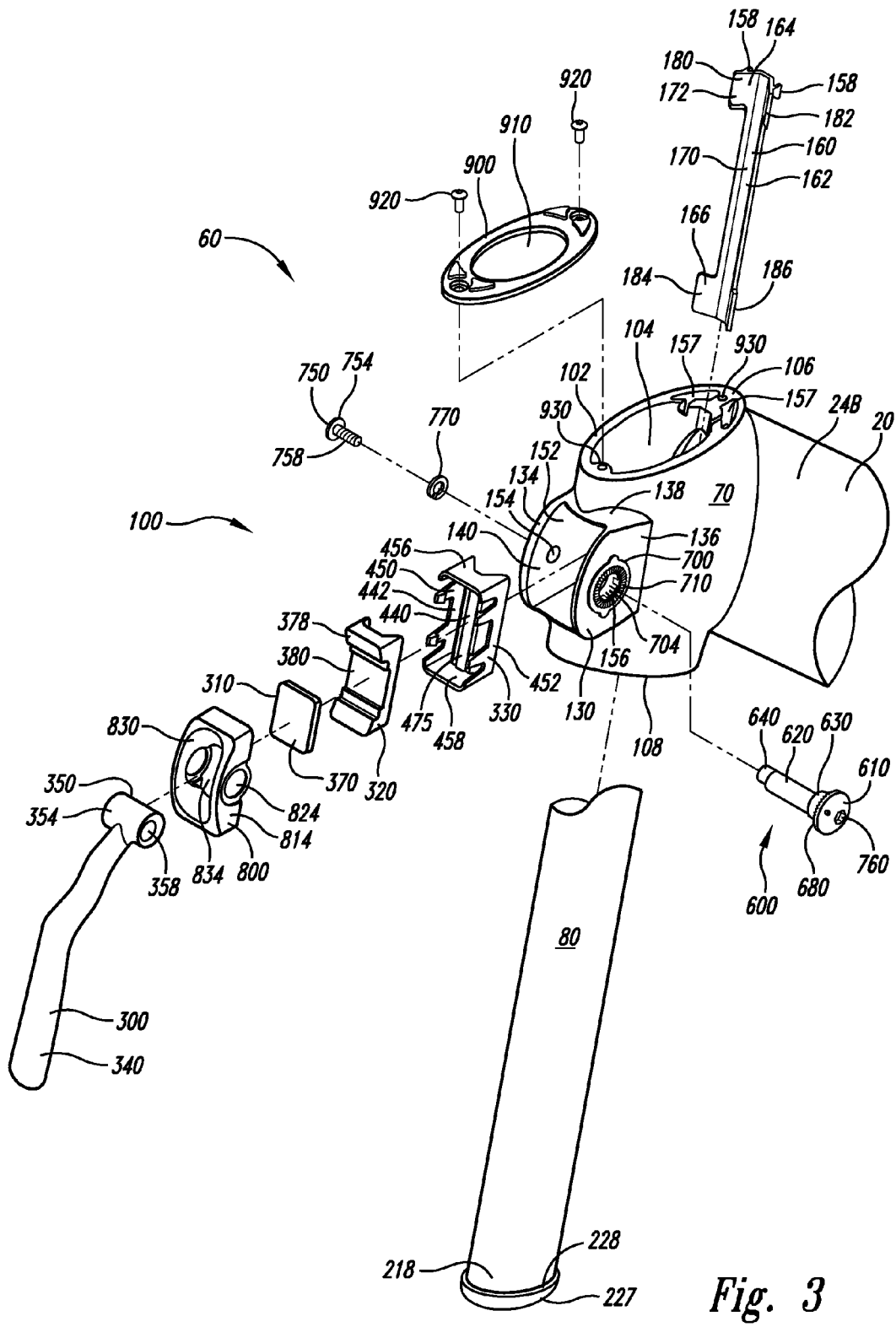
FIG. 3 is an exploded perspective view of the mounting assembly of FIG. 2.
Figure 4:
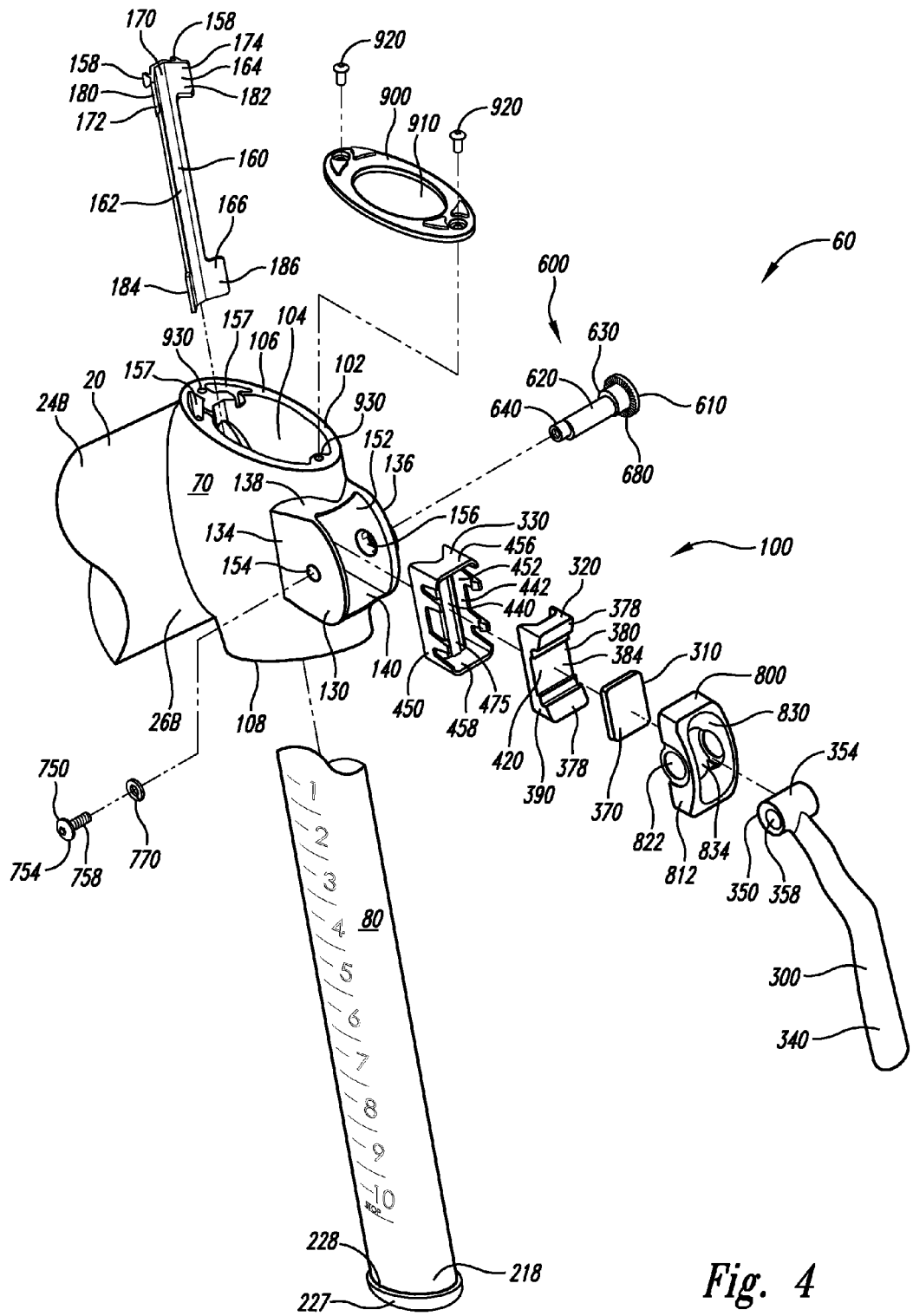
FIG. 4 is an exploded perspective view of the mounting assembly of FIG. 2 as viewed from another side.

As shown in FIGS. 3 and 4, the collar 70 has a generally hollow shape defined by a sidewall 102. The sidewall 102 defines an interior channel 104 configured to slidably receive the member 80 and permit it to slide longitudinally therein upward and downward. The sidewall 102 extends from a top edge portion 106 to a bottom edge portion 108.

Figure 5:
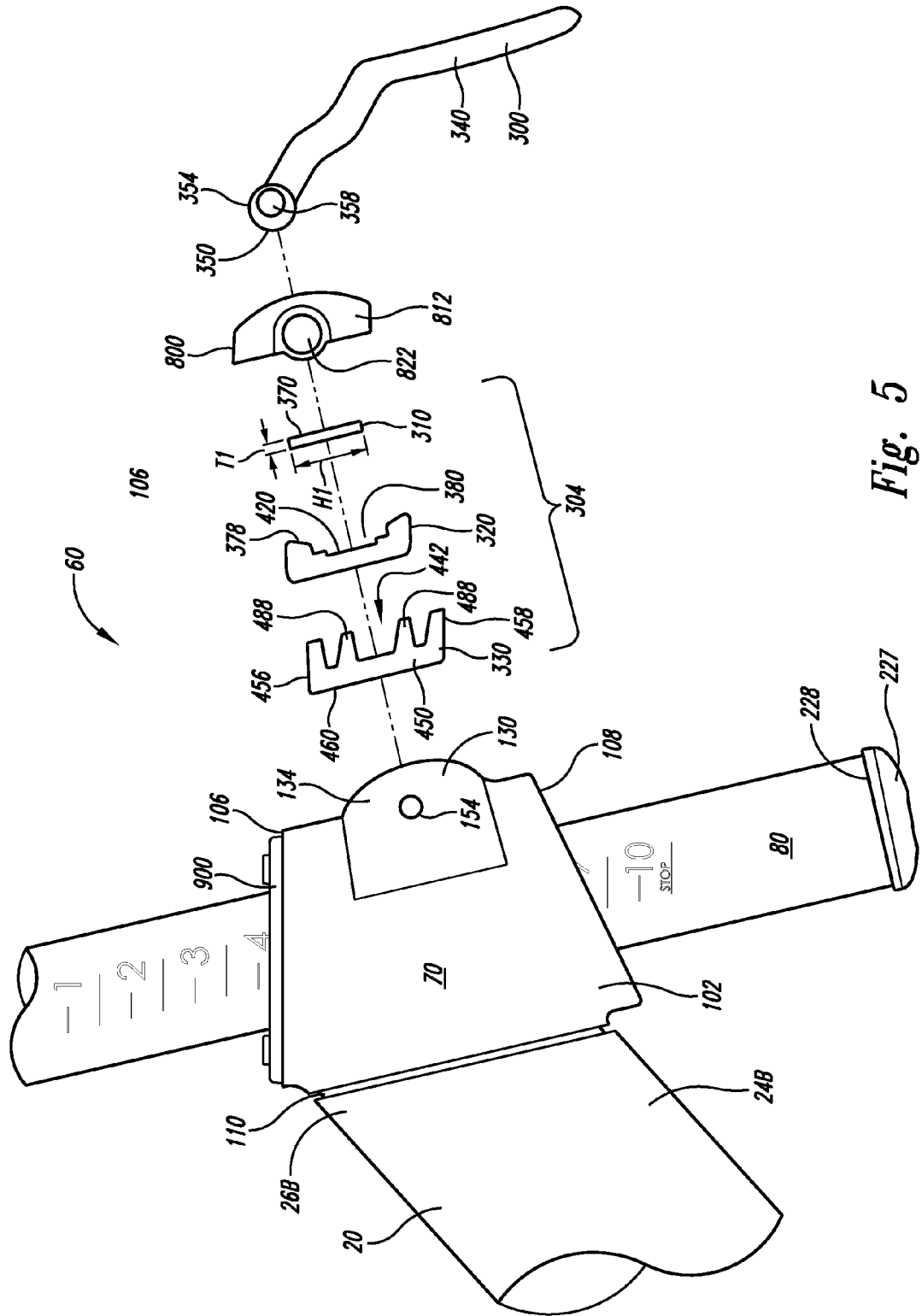
FIG. 5 is a partially exploded side elevational view of the mounting assembly of FIG. 2 in which the locking assembly of the mounting assembly has been exploded.
Figure 6:
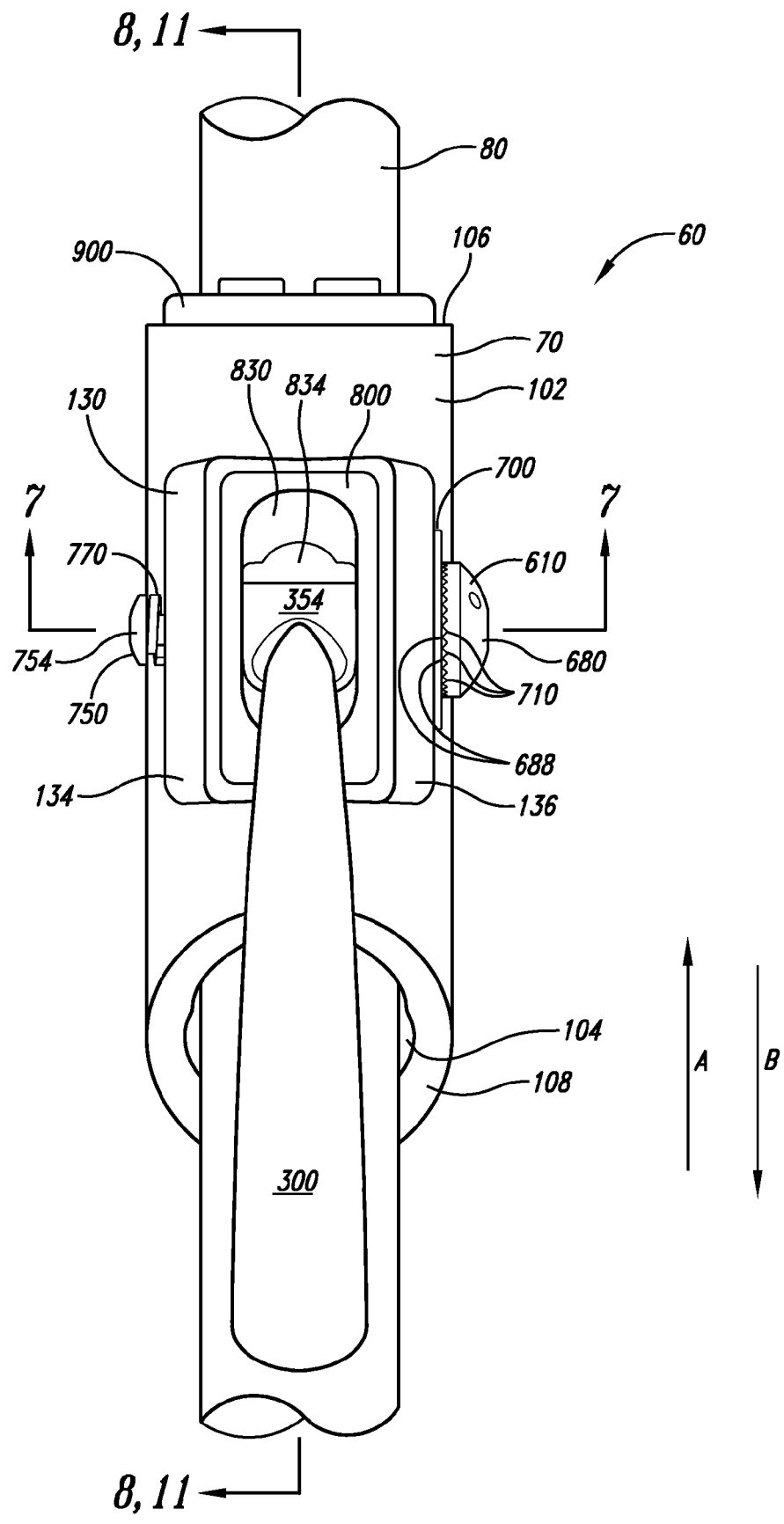
FIG. 6 is an enlarged front perspective view of the mounting assembly of FIG. 2.
Figure 8:
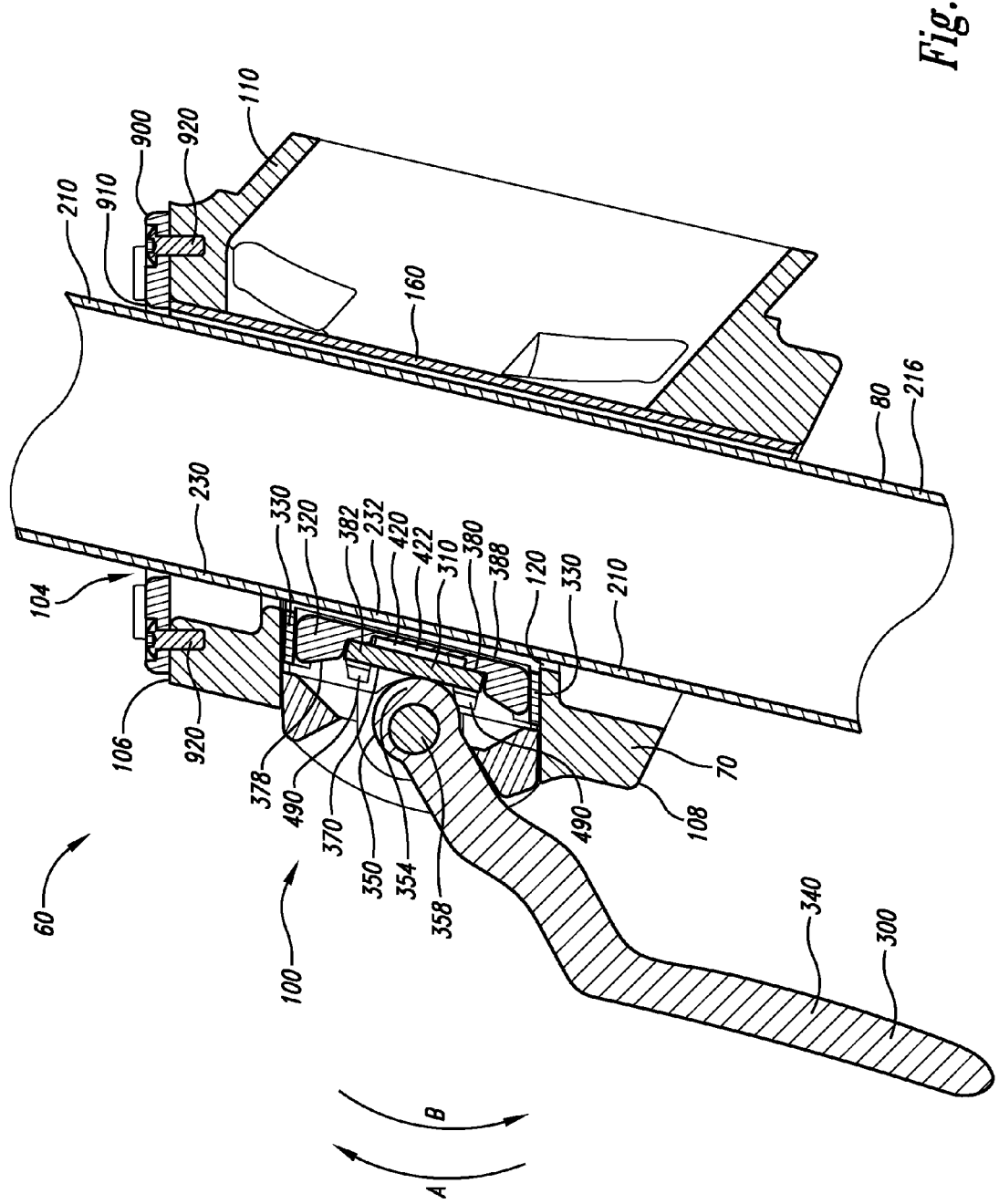
FIG. 8 is a cross-sectional view of the mounting assembly of FIG. 2 taken substantially along line 8-8 of FIG. 6 illustrating the handle of the locking assembly positioned in a locked position.

As shown in the drawings, the collar 70 is mounted to the end portion 26B of the frame member 24B. Referring to FIGS. 5 and 8, the sidewall 102 of the collar 70 includes an insert portion 110 configured to be inserted into the open end portion 26B of the hollow frame member 24B.

However, as is appreciated by those of ordinary skill, the collar 70 may be coupled to the end portion 26B of the frame member 24B using any method known in the art and the invention is not limited by the method chosen. Further, the frame member 24B need not be hollow to effect such a coupling and embodiments in which the frame member 24B is solid or partially filled are also within the scope of the present invention. The collar 70 may also be formed integral with the frame member 24B.

Figure 7:
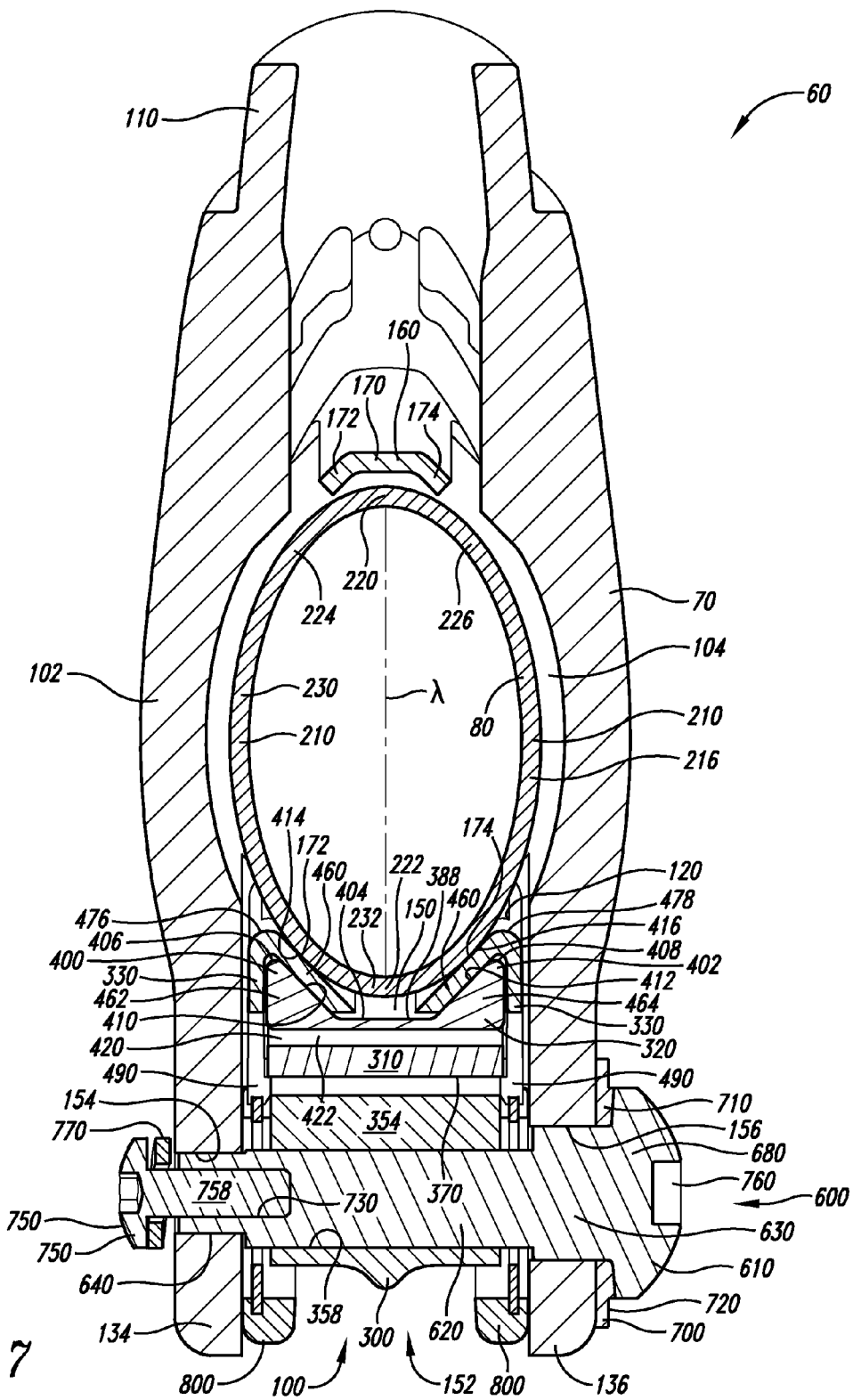
FIG. 7 is a cross-sectional view of the mounting assembly of FIG. 2 taken substantially along line 7-7 of FIG. 6.

A through-hole 120 (see FIGS. 7 and 8) is formed in the sidewall 102 between the top edge portion 106 and the bottom edge portion 108. The through-hole 120 may be located opposite the insert portion 110 along the sidewall 102 of the collar 70. As shown in FIGS. 3 and 4, the collar 70 includes a housing 130 mounted to the sidewall 102, constructed around the through-hole 120 (see FIGS. 7 and 8), and configured to house the locking assembly 100. The housing 130 includes a pair of spaced apart and confronting lateral walls 134 and 136 positioned to flank the through-hole 120. The housing 130 may include a pair of spaced apart and confronting upper and lower transverse walls 138 and 140 positioned to flank the through-hole 120 and extend between the lateral walls 134 and 136. The walls 134, 136, 138, and 140 may combine to form a generally channel-shaped structure that is open at both ends and has a generally rectangular cross-sectional shape. Referring to FIG. 7, the housing 130 has a proximal open end 150 adjacent to the member 80 disposed inside the collar 70 and a distal open end 152 spaced outwardly from the member 80.

The walls 134 and 136 each include an aperture 154 and 156, respectively. The apertures 154 and 156 are juxtaposed with one another across the through-hole 120 and aligned by their centers. The apertures 154 and 156 may have a generally circular shape. In the embodiment depicted in the figures, the aperture 154 has a diameter that is substantially smaller than the diameter of the aperture 156. However, embodiments in which the aperture 154 has a diameter substantially greater than or equal to the diameter of the aperture 156 are also within the scope of the present invention. The diameter of the aperture 154 may be about 0.2 inches to about 0.8 inches and the diameter of the aperture 156 may be about 0.2 inches to about 0.8 inches.

Along its top edge portion 106, the collar 70 may include one or more recesses 157 each configured to receive one or more tabs 158 of a wear plate 160 (described below). While the wear plate 160 is illustrated as hanging by the tabs 158 from the recesses 157, those of ordinary skill readily appreciate that alternate structures may be used to maintain the wear plate 160 inside the interior channel 104 of the collar 70 and such alternate structures are within the scope of the present invention.

The collar 70 may constructed from any suitable material known in the art including plastics such as Polyoxymethylene/Delrin (POM), Nylon 6 and Nylon 66 including MoS2 (Molybdenum Sulfide) and PTFE (Nylon) filled, and the like, as well as metals such as brass, zinc, and the like. The invention is not limited by the material used to construct the collar 70.

Figure 9:
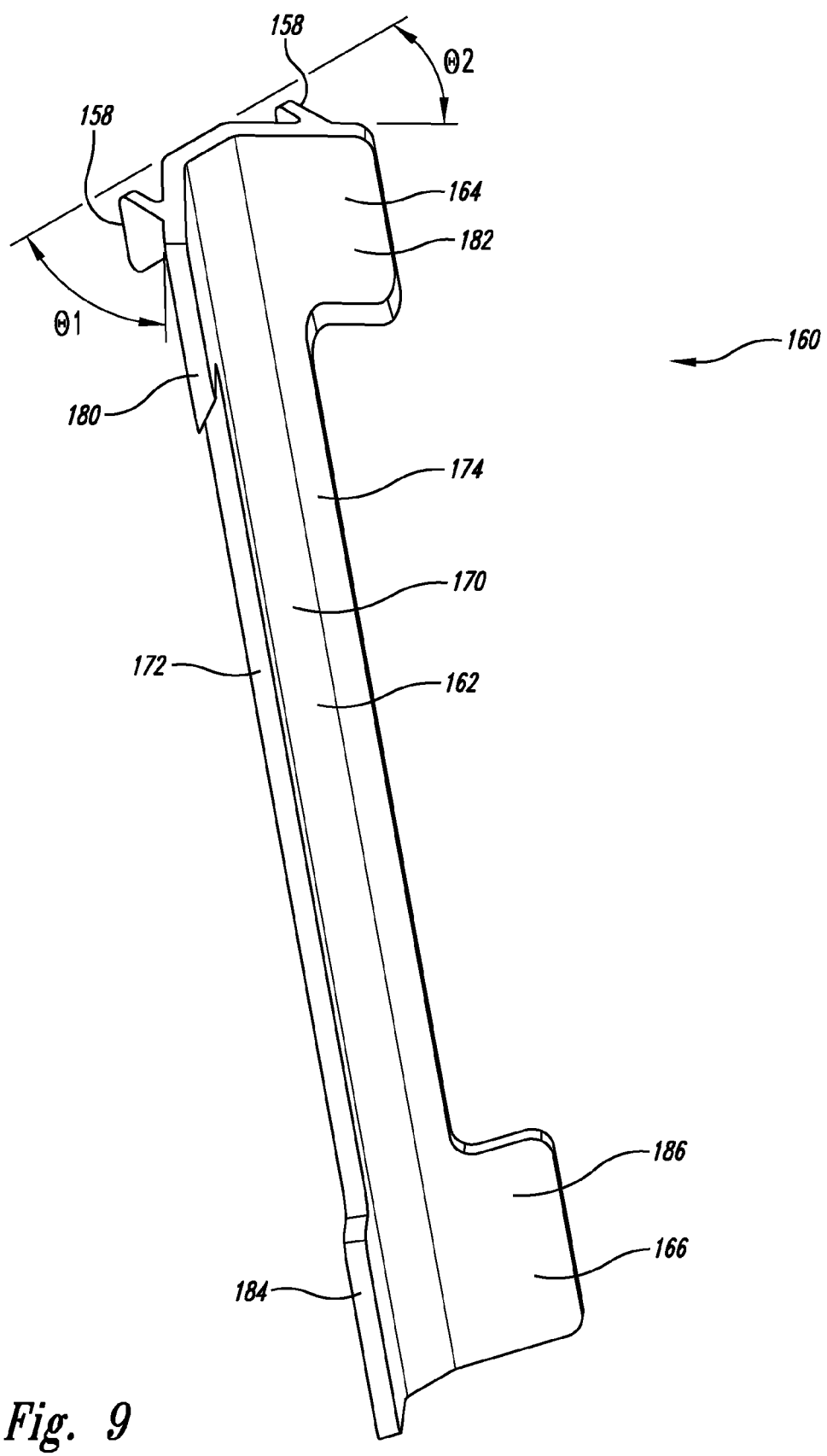
FIG. 9 is an enlarged perspective view of a wear plate of the mounting assembly of FIG. 2.

As may best be viewed in FIGS. 3 and 4, in the embodiment depicted in the figures, the wear plate 160 is mounted inside the collar 70 between the sidewall 102 of the collar 70 and the member 80. The wear plate 160 may be mounted adjacent the insert portion 110 (see FIG. 7) and opposite the through-hole 120 along the sidewall 102. Referring to FIG. 9, the wear plate 160 may be generally I-shaped having an elongated portion 162 flanked by a top portion 164 and a bottom portion 166. As is appreciated by those of ordinary skill in the art, the wear plate 160 may constructed using alternative shapes including elongated shapes such as rectangular, oval, elliptical, triangular, amoeba, arbitrary, and the like. The wear plate 160 may be contoured to conform to the shape of the member 80.

In the embodiment depicted in the drawings, the wear plate 160 is bent longitudinally to define a longitudinally extending midsection 170 flanked on one side by a first flange 172 and on the other side by a second flange 174. An outside angle "θ1" is defined between the first flange 172 and the midsection 170.

An outside angle "θ2" is defined between the second flange 174 and the midsection 170. The angle "θ1" may range from about 1 degree to about 60 degrees. In some embodiments, the angle "θ1" may range from about 5 degree to about 45 degrees. The angle "θ2" may be substantially equal to the angle "θ1."

A portion 180 of the first flange 172 and a portion 182 of the second flange 174 are located in the top portion 164 of the wear plate 160. Similarly, a portion 184 of the first flange 172 and a portion 186 of the second flange 174 are located in the bottom portion 166 of the wear plate 160. The portions 180, 182, 184, and 186 are arranged within the collar 70 to contact the member 80 disposed in the interior channel 104 of the collar 70. The portions 180, 182, 184, and 186 bear against the member 80 and resist rotation thereby within the collar 70. In the embodiment depicted in the figures, the midsection 170 is spaced from the member 80 and does not contact it.

The portions 180 and 182 form a pair of upper engagement members or contacts with the member 80 and the portions 184 and 186 form a pair of lower engagement members or contacts with the member 80. However, it is appreciated by those of ordinary skill in the art, that the upper engagement members or contacts may be formed by two separate spaced apart members (not shown) that are not connected together and such embodiments are within the scope of the present invention. Similarly, the lower engagement members or contacts may be formed by two separate spaced apart members (not shown) that are not connected together and such embodiments are within the scope of the present invention. The locking assembly 100 provides a pair of intermediate movable engagement members or contacts (described below) with the member 80 that are located between the upper and lower pairs of engagement members. In combination, these three pairs of engagement members maintain the member 80 in a substantially stationary position inside the collar 70 when the locking assembly 100 is in a locked position.

One of the tabs 158 of the wear plate 160 may be coupled to each of the portions 180 and 182. Each of the tabs 158 may extend outwardly from the portion (180 or 182) to which it is coupled and into one of the recesses 157 of the collar 70. The tabs 158 may bear against a portion (not shown) of the inside of the recess 157 into which it is received and help bias the portions 180 and 182 against the member 80.

The wear plate 160 may be constructed from any material known in the art including Teflon, steel coated with Teflon, and the like as well as from any material suitable for constructing the collar 70. The material selected may be coated with or impregnated by Teflon, molybnum sulfide, and the like. Preferably, the material used to construct the wear plate 160 is resilient enough to bear against the member 80 without plastic deformation when the locking assembly 100 is in the locked position. Further, the wear plate 160 may be constructed from a material having a low enough coefficient of friction to allow the member 80 to slide alongside it when the locking assembly 100 is not in the locked position. The wear plate 160 may be about 0.03 inches to about 1.0 inches thick. In various embodiments, the wear plate 160 may be about 0.06 inches to about 0.25 inches thick.

Member 80

Referring to FIGS. 7 and 8, the member 80 may be generally elongated and have a portion 210 configured to be slidably received inside the interior channel 104 of the collar 70. The member 80 may be constructed from a section 216 of hollow tube having an open end 218 (see FIG. 3) and a generally elliptical cross-sectional shape (best viewed in FIG. 7). Like any ellipse, the elliptical cross-sectional shape of the member 80 has a major axis "A" extending across its widest portion from a first end portion 220 to a second end portion 222 that bifurcates the elliptical cross-sectional shape into a first side portion 224 and a second side portion 226. The portions 180 and 182 of the wear plate 160, which form a pair of upper engagement members with the member 80, are in contact with the first side portion 224 and the second side portion 226, respectively. Likewise, the portions 184 and 186 of the wear plate 160, which form a pair of lower engagement members with the member 80, are in contact with the first side portion 224 and the second side portion 226, respectively. The elliptical cross-sectional shape may allow some degree of rotation of the member 80 within the collar 70 for the purposes of rotational adjustment. However, the placement of the upper and lower pairs of engagement members (i.e., portions 180, 182, 184, and 186) on the first and second side portions 224 and 226 resist larger undesirable rotation of the member 80 within the collar 70 during use of the exercise device 10.

As is appreciated by those of ordinary skill in the art, the member 80 may have an alternate cross-sectional shape such as circular, square, rectangular, octagonal, triangular, arbitrary, and the like. Further, the member 80 may be solid or partially solid. The invention is not limited by the cross-sectional shape or the presence of or absence of material(s) inside the member 80. The member 80 may be constructed using any suitable material known in the art including steel, aluminum, plastic, and the like.

Optionally, a cap or plug 227, illustrated in FIGS. 3 and 4, may be inserted into the lower open end 218 of the member 80. The plug 227 may be configured to apply an outwardly directed force to the inside of the section 216 of hollow tube thereby preventing removal of the plug 227 from the open end 218 of the section 216 of hollow tube. The plug 227 may have a lip 228 configured to prevent the member 80 from being slidably removed from the collar 70 in the upward direction.

Returning to FIGS. 7 and 8, when the portion 210 of the member 80 is slidably received inside the interior channel 104 of the collar 70, a variable selected portion 230 of the member 80 is disposed inside the collar 70. The through-hole 120 provides access for the locking assembly 100 to an exposed portion 232 of the selected portion 230 of the member 80 disposed inside the collar 70

Locking Assembly 100

The locking assembly 100 is operable to lock the member 80 within the collar 70 thereby preventing the member 80 from sliding within the collar 70 and maintaining the member 80 in a substantially stationary position relative to the collar 70. While the member 80 is locked within the collar 70, the user may operate the exercise device 10 without the member 80 sliding within the collar 70 and possibly injuring the user. The locking assembly 100 is also operable to release the locked member 80 thereby allowing the member 80 to slide within the collar 70. While the member 80 is released, the user may slide the member 80 inside the collar 70 to position the positionable component (in this case the handlebar assembly 40) in a desired position.

Figure 10:
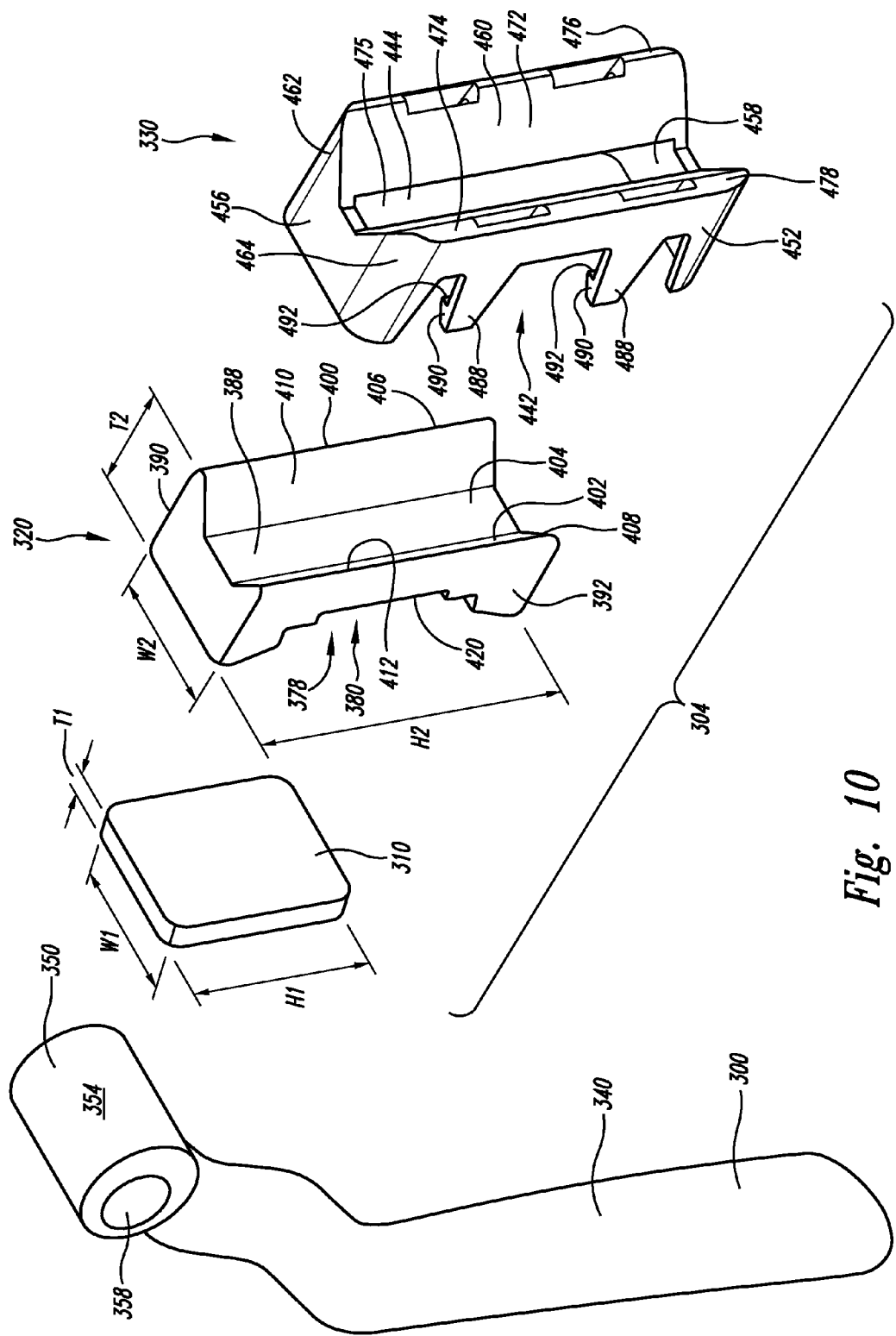
FIG. 10 is an enlarged exploded perspective view of a handle, a mechanical fuse, a force distribution member, and a guard member of the locking assembly of the mounting assembly of FIG. 2.

As shown in FIG. 10, the locking assembly 100 includes a handle 300 and a movable force distribution assembly 304. The movable force distribution assembly 304 comprises a mechanical fuse 310, a force distribution member 320, and a guard member 330. Returning to FIGS. 3 and 4, the handle 300 is pivotally mounted to the housing 130 of the collar 70. The handle 300 may be selectively pivoted into and out of a locked position. The handle 300 is illustrated in the locked position in FIGS. 1, 2, 6, and 8, in which the handle 300 is illustrated as being located in its lowest achievable position. The handle 300 is illustrated in the unlocked locked or released position in FIG. 11, in which the handle 300 is illustrated as being located in a position between its highest and lowest achievable positions. While the handle 300 is in the locked position, the member 80 is locked inside the collar 70 and prevented from sliding therein. In other words, the member 80 is maintained in a substantially stationary position relative to the collar 70. When the handle 300 is not in the locked position as is the case in FIG. 11, the member 80 may slide within the collar 70 and be positioned by the user.

Figure 11:
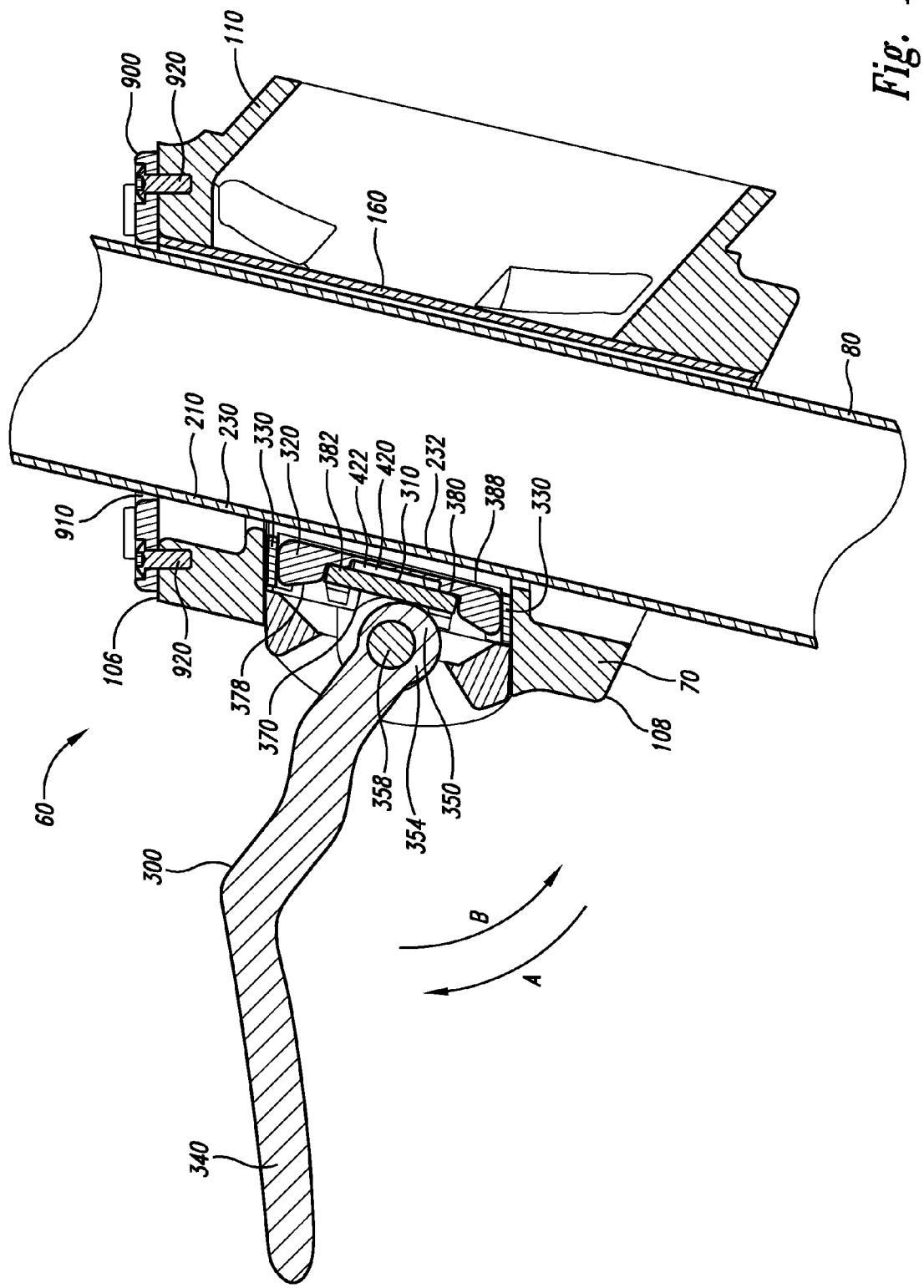
FIG. 11 is a cross-sectional view of the mounting assembly of FIG. 2 taken substantially along line 8-8 of FIG. 6 illustrating the handle of the locking assembly positioned in an unlocked position.

The handle 300 may be transitioned out of the locked position depicted in FIG. 8 and into the unlocked position depicted in FIG. 11 by pivoting the handle 300 in the direction indicated by arrow "A." The handle 300 may be transitioned into the locked position depicted in FIG. 8 from the unlocked position depicted in FIG. 11 by pivoting the handle 300 in the direction indicated by arrow "B."

As may best be viewed with reference to FIGS. 2, 5, 10, and 11, the handle 300 includes a grip portion 340 coupled to a biasing portion 350. The grip portion 340 exits the distal open end 152 of the housing 130 and extends outwardly therefrom allowing the user to grasp the grip portion 340. The biasing portion 350 is housed inside the housing 130. The user pivots the handle 300 and thereby the biasing portion 350 by grasping and pivoting the grip portion 340 in the directions indicated by arrows "A" and "B" depicted in FIGS. 2, 6, 8, and 11. The handle 300 may be constructed using any materials known in the art including rubberized steel, plastic, aluminum, and the like.

The biasing portion 350 may include a substantially cylindrically shaped cam 354 having an eccentric open-ended channel 358 extending longitudinally therethrough. The channel 358 may be located adjacent to the grip portion 340 of the handle 300. Like all cams, the cam 354 converts the rotary circumferentially directed force of the handle 300 imparted by the user into a linearly inward directed biasing force. The biasing force is applied to a cam follower assembly such as the force distribution assembly 304 (see FIG. 11). With respect to the embodiment depicted in the figures, the biasing force exerted by the cam is applied directly to the mechanical fuse 310 which transmits the force to the force distribution assembly 304.

As may be best viewed in FIGS. 3, 4, 5, and 10, the mechanical fuse 310 is generally planar and located inwardly from the handle 300 within the housing 130. The mechanical fuse 310 has an outwardly facing surface 370 adjacent to and contacted by the biasing portion 350 of the handle 300, when the handle 300 is moved toward the locked position (see FIGS. 1, 2, 6, and 8). When the handle 300 is in the locked position, the biasing portion 350 of the handle 300 is oriented in a biasing position in which the biasing portion 350 contacts the surface 370 of the mechanical fuse 350 and exerts the linearly inward directed force of the cam 354 thereupon. If this force exceeds a predetermined threshold, the mechanical fuse 310 may deform or fail, thereby preventing damage to the other components of the locking assembly 100, the collar 70, and/or the member 80.

The mechanical fuse 310 may be constructed from any suitable material known in the art including steel, aluminum, re-enforced plastic, and the like. The dimensions of the mechanical fuse 310 may be determined by the amount of force required to cause the mechanical fuse 310 to deform or fail. By way of non-limiting example, the mechanical fuse 310 may be a square plate having a height "H1" and width "W1" of about 1.15 inches to about 0.95 inches and a thickness "T1" of about 0.15 inches.

The mechanical fuse 310 translates at least a portion of the force applied to it by the biasing portion 350 of the handle 300 to the force distribution member 320, which in turn distributes the linearly directed force to the guard member 330. As is apparent to those of ordinary skill, in alternate embodiments, the mechanical fuse 310 may be omitted and the biasing portion 350 may apply the linearly directed force directly to the force distribution member 320 or to the guard member 330. In other words, in such embodiments, the functionality of a cam follower is provided by the force distribution member 320 or the guard member 330. Embodiments in which the biasing portion 350 applies the linearly directed force directly to the guard member 330 may include or omit the force distribution member 320.

The force distribution member 320 is configured to transfer force applied to it by the cam 354 of the biasing portion 350 (via the optional mechanical fuse 310) to the member 80 (via the optional guard member 330, described below). The force distribution member 320 includes an outwardly facing face 378 having a recess 380 configured to receive a portion 382 (see FIGS. 8 and 11) of the mechanical fuse 310 formed therein. Turning to FIG. 10, the force distribution member 320 includes an inwardly facing face 388 opposing the outwardly facing face 378 and facing toward the portion 230 of the member 80 disposed inside the collar 70 (see FIGS. 7 and 8). The force distribution member 320 includes a first side 390 extending between the outwardly facing face 378 and the inwardly facing face 388 and a second side 392 opposing the first side 390 and extending between the outwardly facing face 378 and the inwardly facing face 388. The recess 380 may extend the full width "W2" of the force distribution member 320 defined between the first side 390 and the second side 392 and may be open along the first side 390 and the second side 392.

The inwardly facing face 388 has at least one inwardly extending projection. In the embodiment depicted in the figures, the inwardly facing face 388 has a first longitudinally extending projection 400 spaced laterally from a second longitudinally extending projection 402. The projections 400 and 402 depicted in the drawings have a generally V-shaped cross-sectional shape that narrows as the projections extend inwardly toward the member 80. The first longitudinally extending projection 400 may be formed along the first side 390 of the force distribution member 320 and the second longitudinally extending projection 402 may be formed along the second side 392 of the force distribution member 320. A surface 404 may extend along a portion of the inwardly facing face 388 between the projections 400 and 402. The first projection 400 has a distal edge portion 406 spaced inwardly from the surface 404 and the second projection 402 has a distal edge portion 408 spaced inwardly from the surface 404.

The first projection 400 has a tapered surface 410 that extends from the surface 404 to the distal edge portion 406 of the first projection 400. The second projection 402 has a tapered surface 412 that extends from the surface 404 to the distal edge portion 408 of the second projection 402. As may best be viewed in FIG. 7, the tapered surfaces 410 and 412 are configured so that a portion of each engages through the guard member 330 first and second portions 414 and 416 of the member 80, respectively. The projections 400 and 402 are configured so that the distal edge portions 406 and 408, respectively, are spaced from and do not engage the member 80. In the embodiment depicted in FIG. 7, the projections 400 and 402 are configured so that the distal edge portions 406 and 408, respectively, are spaced from and do not engage the guard member 330.

In the embodiment depicted in the figures, portions of the guard member 330 are positioned between the force distribution member 320 and the member 80. However, the general configuration and basic function of the tapered surfaces 410 and 412 are not changed by the intervening portions of the guard member 330. In other words, the size, shape, and contour of the tapered surfaces 410 and 412 are determined at least in part by the configuration of the member 80. Further, the portions of the guard member 330 positioned between the force distribution member 320 and the member 80 may simply conform to the tapered surfaces 410 and 412. Turning to FIGS. 4, 5, and 8, the recess 380 of the force distribution member 320 may include an interior recess 420 that forms a cavity 422 under the mechanical fuse 310 when the mechanical fuse 310 is received inside the recess 380. The mechanical fuse 310 may bend or deform into the cavity 422 when pressure is applied to the mechanical fuse 310 by the biasing portion 350 of the handle 300. The cavity 422 may extend the full width "W2" of the force distribution member 320 and may be open along the first side 390 and second side 392.

The force distribution member 320 may be constructed from any suitable material known in the art including steel, aluminum, plastic, and the like. By way of non-limiting example, the force distribution member 320 may have a height "H2" of about 1.0 inches to about 4.0 inches, width "W2" of about 0.75 inches to about 3.0 inches, and a thickness "T2" of about 0.4 inches to about 1.5 inches.

Turning to FIGS. 3, 4, and 10, the guard member 330 has an open-ended interior cavity 440 having an outwardly facing opening 442. The outwardly facing opening 442 is configured to receive the force distribution member 320 therethrough into the interior cavity 440. The interior cavity 440 generally conforms to at least a portion of the force distribution member 320. The interior cavity 440 may be defined between a pair of opposing sidewalls 450 and 452 coupled together at one end by a top wall 456 and at the other end by a bottom wall 458 opposing the top wall 456. The guard member 330 also includes a contoured portion 460 configured to be positioned adjacent to the portion 232 of the member 80 disposed inside the collar 70 (see FIG. 7).

Each of the projections 400 and 402 of the force distribution member 320 nests inside a substantially hollow portion 462 and 464, respectively, of the contoured portion 460 of the guard member 330. Each of the portions 462 and 464 has a generally V-shaped cross-sectional shape configured to receive one of the projections 400 and 402 fully and conform to the generally V-shaped cross-sectional shape of the projections 400 and 402. The hollow portion 462 includes a tapered guard wall 472 and the hollow portion 464 includes tapered guard wall 474. When the force distribution member 320 is received fully inside the interior cavity 440 of the guard member 330, the projections 400 and 402 are nested inside the hollow portions 462 and 464, respectively. Further, the tapered guard wall 472 is adjacent and conforms to the tapered surface 410, and the tapered guard wall 474 is adjacent and conforms to the tapered surface 412. The tapered guard walls 472 and 474 may be about 0.03 inches to about 0.5 inches thick.

An opening 475 may be disposed between the hollow portions 462 and 464 of the contoured portion 460 of the guard member 330. The opening 475 may help ensure that the tapered surfaces 410 and 412 bear against the tapered guard walls 472 and 474, respectively, of the guard member 330 when the force distribution member 320 is received inside the guard member 330. The opening 475 may be positions so that the surface 404 does not bear against the inside of the cavity 440 in a manner that prevents or interferes with contact between the tapered surfaces 410 and 412 and the tapered guard walls 472 and 474, respectively, of the guard member 330

When the locking assembly 100 is assembled inside the housing 130, the guard wall 472 is disposed between the tapered surface 410 and the first portion 414 of the member 80 and the guard wall 474 is disposed between the tapered surface 412 and the second portion 416 of the member 80. The tapered guard walls 472 and 474 are configured so that a portion of each engages the first and second portion 414 and 416 of the member 80, respectively. Each of the portions 462 and 464 includes a distal edge portion 476 and 478, respectively. As may best be viewed in FIG. 7, the portions 462 and 464 are configured so that the distal edge portions 476 and 478, respectively, are spaced from and do not engage the member 80.

The force distribution member 320 may be received inside the interior cavity 440 of the guard member 330 with the mechanical fuse 310 disposed inside the recess 380 of the force distribution member. The sidewalls 450 and 452 of the guard member 330 may include one or more outwardly extending fingers 488. Each of the fingers 488 may include a hook or tab 490 that extends inward. Each of the tabs 490 has a lower surface 492 configured to bear against the outwardly facing surface 370 of the mechanical fuse 310 and thereby maintain the mechanical fuse 310 within the recess 380 of the force distribution member 320 and the force distribution member within the interior cavity 440 of the guard member 330.

In the embodiment depicted in the figures, the force distribution member 320 and the mechanical fuse 310 snap inside the guard member 330 forming a snap fit between the force distribution member 320, the mechanical fuse 310, and the guard member 330. However, it is appreciated by those of ordinary skill in the art that alternate methods may be used to assemble two or more of these components together. For example, the mechanical fuse 310 may be glued to the force distribution member 320 using a suitable adhesive, the force distribution member 320 may be glued inside the guard member 330 using a suitable adhesive, the guard member 330 may be molded around the force distribution member 320 using over-molding technologies, and the like. The invention is not limited by the method used to assemble two or more of the force distribution member 320, the mechanical fuse 310, and the guard member 330 together. In alternate embodiments, one or more of the force distribution member 320, the mechanical fuse 310, and the guard member 330 is/are unattached to the other components.

The guard member 330 may function as a guard or sleeve for the force distribution member 320 and is configured to protect it and/or the member 80 from damage that would be caused by repeated contact between the force distribution member and the member. As is appreciated by those of ordinary skill, contact between the guard member 330 and the member 80 may be static and/or dynamic (e.g., sliding) in nature. Therefore, the guard member 330 may be configured to protect the force distribution member 320 and/or the member 80 from damage caused by static and/or dynamic (e.g., sliding) contact between the force distribution member 320 and the member 80. In some embodiments, the guard member 330 may be constructed from a less expensive material making its wear or damage more desirable than wear or damage to the force distribution member 320 and/or member 80. The guard member 330 may be constructed from any suitable material known in the art including plastic, rubber, and the like.

Connector 600

Figure 12:
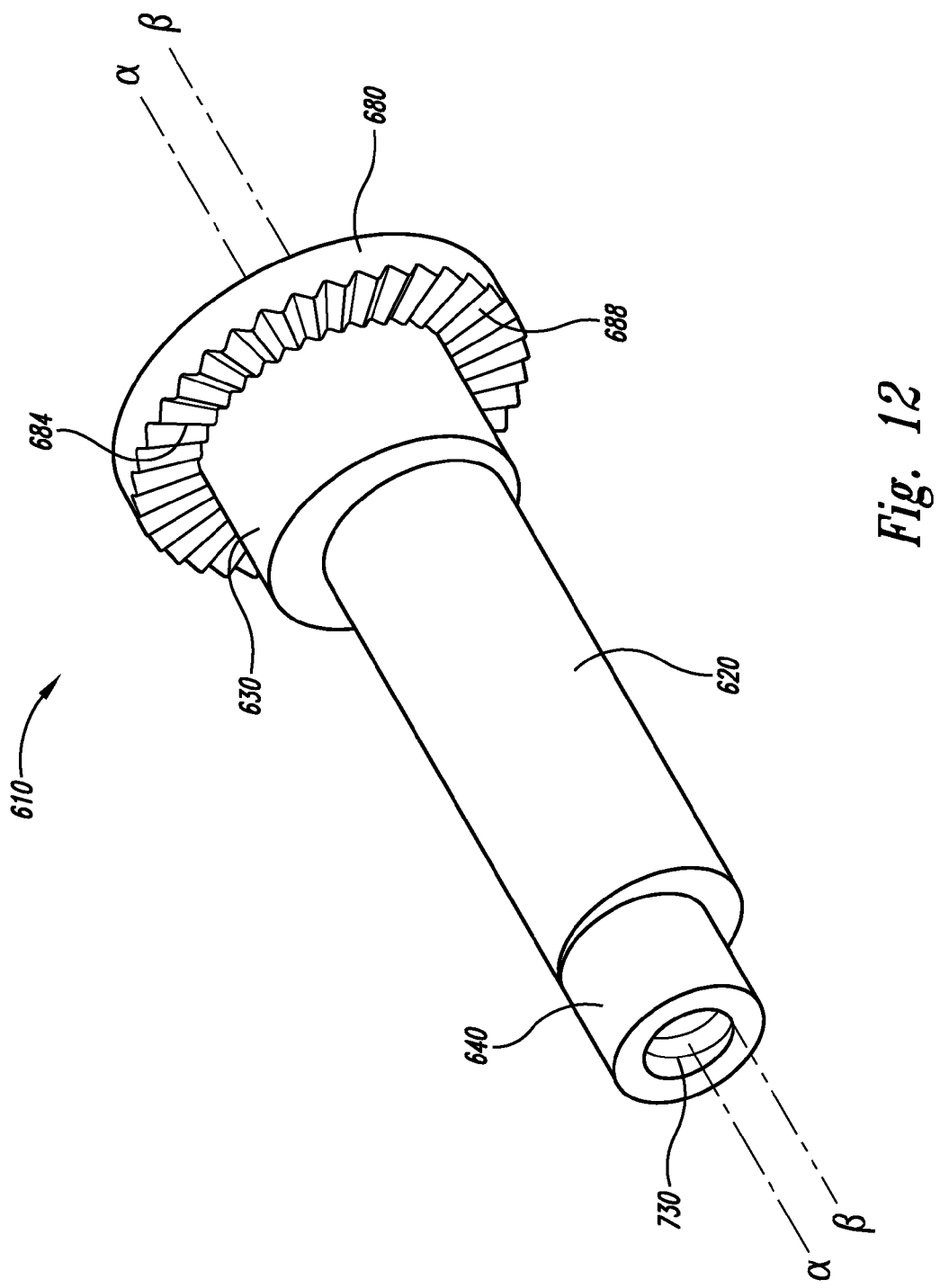
FIG. 12 is an enlarged perspective view of an eccentric pivot pin of the mounting assembly of FIG. 2.

Referring to FIGS. 3, 4, and 7, the locking assembly 100 is mounted to the walls 134 and 136 of the housing 130 by a connector 600. The connector 600 includes an eccentric pivot pin 610 that extends through each of the apertures 154 and 156 and across the through-hole 120. Turning to FIGS. 12, the eccentric pivot pin 610 has an eccentric portion 620 flanked by a first end portion 630 and a second end portion 640. The eccentric pivot pin 610 has two axes of rotation. The first axis corresponds to the longitudinal center axis "α" of the eccentric pivot pin 610. The eccentric portion 620 is eccentric with respect to the longitudinal center axis "α" and each of the first end portion 630 and the second end portion 640 are concentric with respect to the longitudinal center axis "α." The second axis of rotation is a longitudinal center axis "β" of the eccentric portion 620.

Returning to FIGS. 3, 4, and 7, the first end portion 630 is received inside the aperture 154 and is configured to rotate therein about the longitudinal center axis "α." The eccentric portion 620 extends through the open-ended channel 358 formed in the cam 354 of the handle 300. When pivoting the handle 300 into and out of the locked position, the handle 300 pivots about the eccentric portion 620 of the eccentric pivot pin 610. The second end portion 640 is received inside the aperture 156 and is configured to rotate about the longitudinal center axis "α" therein.

The eccentric portion 620, the first end portion 630, and the second end portion 640 may all be substantially cylindrically shaped. Alternatively, one or both of the first end portion 630 and the second end portion 640 may be disk shaped. In the embodiment depicted in the drawings, the first end portion 630 has a larger diameter than the second end portion 640. Because the pivot pin 610 does not rotate when the handle 300 is pivoted, the first end portion 630 and the second end portion 640 may have alternate shapes such as square, hexagonal, octagonal, and the like which necessitate removing them from the apertures 154 and 156 to rotate the pivot pin 610 relative to the housing 130.

The first end portion 630 has an enlarged head 680. As may best be viewed in FIG. 12, the underside 684 of the head 680 has a plurality of teeth 688 formed therein and arranged radially around the first end portion 630. Turning to FIGS. 2, 3, 6 and 7, the connector 600 includes a generally disk-shaped plate 700 mounted to the housing 130. The disk-shaped plate 700 is mounted over the aperture 154 and has an aperture 704 (see FIG. 3) formed therein to provide an ingress or entryway into the aperture 154. The disk-shaped plate 700 has a plurality of teeth 710 formed on its outside surface 720. The teeth 710 are arranged radially around the aperture 704. When the eccentric pivot pin 610 is fully received inside the aperture 154, the teeth 688 formed on the underside 684 of the head 680 mate with the teeth 710 formed on the outside surface 720 of the disk-shaped plate 700, and thereby prevent the eccentric pivot pin 610 from rotating within the apertures 154 and 156. The disk-shaped plate 700 may be held in place by the head 680 of the pivot pin 610.

Turning to FIG. 12, the second end portion 640 of the eccentric pivot pin 610 has an open-ended threaded channel 730 extending inwardly along the longitudinal center axis "α." The connector 600 includes a threaded bolt 750 (see FIG. 7) having a head portion 754 and a threaded portion 758 configured to be inserted and threaded into the channel 730. To couple the connector 600 to the housing 130, the eccentric pivot pin 610 is inserted into the aperture 154, across the through-hole 120, and into the aperture 156. Then, the threaded portion 758 of the threaded bolt 750 is threaded into the channel 730. The head portion 754 is too large to be received inside the aperture 156 and remains outside the housing 130 when the threaded portion 758 is inside the channel 730. The threaded portion 758 may be rotated within the channel 730 to tighten and loosen the threaded connection between the threaded portion 758 and the channel 730, thereby drawing the teeth 688 formed on the underside 684 of the head 680 into and out of engagement with the teeth 710 formed on its outside surface 720 of the disk-shaped plate 700. When the teeth are disengaged from the teeth 710, the head 680 may be rotated to determine the rotational position of the eccentric portion 620 of the eccentric pivot pin 610. Because the eccentric portion 620 is eccentric, rotating it about the longitudinal center axis "α" modifies the location of the longitudinal center axis "β" within the housing 130.

The magnitude of the linearly directed force applied by the cam 354 to the other components of the locking assembly 100, the collar 70, and/or the member 80 may be adjusted by rotating the first end portion 630 and the second end portion 640 to a selected position within the apertures 154 and 156, respectively. The first end portion 630 and the second end portion 640 may be rotated by rotating the head 680 using any method known in the art. In the embodiment depicted in the drawings, the head 680 includes a hexagonally shaped cavity 760 (see FIG. 2) configured to receive a hexagonal head of a screwdriver (not shown), which may be used to rotate the head 680 of the eccentric pivot pin 610. Because the handle 300 pivots about the longitudinal center axis "β," modifying its location also modifies the position of the handle 300 relative to the collar 70. Tightening the threaded bolt 750 in the channel 730, engages the teeth 688 with the teeth 710 and maintains the first end portion 630 and the second end portion 640 within the apertures 154 and 156 in the selected position, thereby maintaining the handle 300 in a selected position relative to the collar 70.

The connector 600 may be uncoupled from the housing 130 by removing the threaded portion 758 of the threaded bolt 750 from the channel 730. Then, withdrawing the eccentric pivot pin 610 from the apertures 154 and 156. A lock washer 770 is disposed around the threaded portion 758 between the head portion 754 and the wall 134.

The disk-shaped plate 700 may include symbols 702 (see FIG. 2), such as plus sign, minus sign, arrows, and the like to indicate the direction of adjustment. One or more slots (not shown) may be disposed in a portion of the sidewall 136 under the disk-shaped plate 700. The disk-shaped plate 700 may include one or more projection configured to be received into the slot(s). To adjust the rotational position of the disk-shaped plate 700 relative to the sidewall 136, the particular slot(s) into which the projection(s) are inserted may be modified. In other words, the projection(s) on the underside of the disk-shaped plate 700 may be disengaged from the slot(s), the disk-shaped plate 700 rotated, and the projection(s) in the underside of the disk-shaped plate 700 reinserted into different slot(s).

Optional Covers

Turning to FIGS. 3-6, the locking assembly 100 may include an optional cover 800. The cover 800 may have a pair of sidewalls 812 and 814 that flank the biasing portion 350 of the handle 300. The sidewalls 812 and 814 each include an aperture 822 and 824, respectively, that are aligned with the apertures 154 and 156, respectively, and the open ends of the channel 358 when the locking assembly 100 is assembled inside the housing 130. In this manner, the eccentric pivot pin 610 may extend through the aperture 154, the aperture 822, the channel 358, aperture 824, and the aperture 156. The sidewalls 812 and 814 may be constructed from an suitable material known in the art including steel, aluminum, and the like. The sidewalls 812 and 814 may be coupled to a contoured decorative portion 830 configured to close a portion of the distal open end 152 of the housing 130. The cover 800 may include an aperture 834 through which the grip portion 340 of the handle 300 may exit the housing 130. The decorative portion 830 may be constructed from any suitable material known in the art including rubber, plastic, and the like. By way of example, the cover 800 may be constructed by inserting sidewalls 812 and 814 constructed of steel into the decorative portion 830 constructed from molded rubber.

Still with reference to FIGS. 3-6, the mounting assembly 60 may include an optional generally oval-shaped cover plate 900. The cover plate 900 is configured to rest upon the top edge portion 106 of the collar 70. The cover plate 900 includes an aperture 910 configured to permit the portion 210 of the member 80 to pass therethrough and into the collar 70. As is apparent to those of ordinary skill, the general shape of the aperture 910 may correspond to the cross-sectional shape of the portion 210 of the member 80. In the embodiment depicted in the drawings, the aperture 910 has a generally elliptical inside shape corresponding to the generally elliptical cross-sectional shape of the portion 210 of the member 80. The cover plate 900 may be affixed to the top edge portion 106 of the collar 70 by one or more fasteners 920, such as screws, bolts, and the like that extend into the sidewall 102 of the collar 70. One or more holes 930 may be formed in the sidewall 102 of the collar 70 and configured to receive the fasteners 920 therein.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A locking assembly comprising:
   a collar having an interior channel defined by a sidewall and a through-hole formed in the sidewall;
   a member having a member sidewall with an elliptical cross-sectional shape with a major axis extending across a widest portion of the elliptical cross-sectional shape from a first end portion to a second end portion and bifurcating the member sidewall into a first side portion and a second side portion, the member being slidably received inside the interior channel of the collar and configured to slide back and forth along a predetermined sliding path, the through-hole formed in the sidewall of the collar being adjacent to the second end portion of the member sidewall;
   a first engagement member disposed inside the interior channel of the collar adjacent to the first end portion of the member sidewall, the first engagement member being configured to engage portions of both the first side portion and the second side portion of the member sidewall located toward the first end portion of the member sidewall;
   a second engagement member disposed inside the interior channel of the collar adjacent to the first end portion of the member sidewall and spaced from the first engagement member along the predetermined sliding path, the second engagement member being configured to engage portions of both the first side portion and the second side portion of the member sidewall located toward the first end portion of the member sidewall;
   a cam pivotally coupled to the collar and configured to pivot between a locked position and an unlocked position; and
   a cam follower assembly disposed between the cam and the member at the through-hole formed in the sidewall of the collar, the cam follower assembly having a movable engagement member configured to be biased by the cam, the movable engagement member being located between the first engagement member and second engagement member along the predetermined sliding path and adjacent to the second end portion of the member sidewall,
   when the cam is pivoted into the locked position, the cam biases the movable engagement member through the through-hole and into locking engagement with portions of both the first side portion and the second side portion of the member sidewall located toward the second end portion of the member sidewall, thereby locking the member within the collar and preventing its sliding along the predetermined sliding path,
   when the cam is pivoted into the unlocked position, and the cam does not bias the movable engagement member into locking engagement with the first side portion and the second side portion of the member sidewall, thereby releasing the member within the collar and permitting its slide along the predetermined sliding path.

2. The locking assembly of claim 1, wherein the first engagement member comprises a first engagement flange and a second engagement flange, the first engagement flange of the first engagement member positioned for engagement with the first side portion of the member sidewall, and the second engagement flange of the first engagement member positioned for engagement with the second side portion of the member sidewall, and the second engagement member comprises a first engagement flange and a second engagement flange, the first engagement flange of the second engagement member positioned for engagement with the first side portion of the member sidewall, and the second engagement flange of the second engagement member positioned for engagement with the second side portion of the member sidewall.

3. The locking assembly of claim 1, wherein the movable engagement member comprises:
 a guard member having an interior cavity with first and second hollow portions, each partially defined by an outside guard surface positioned for locking engagement with the first and second side portions of the member sidewall; and
 a force distribution member nested inside the interior cavity of the guard member, the force distribution member having laterally spaced apart first and second projections extending toward the member, the first projection being received inside the first hollow portion of the guard member and the second projection being received inside the second hollow portion of the guard member such that when the cam is pivoted into the locked position a portion of the outside guard surface partially defining the first hollow portion engages the first side portion of the member sidewall, and a portion of the outside guard surface partially defining the second hollow portion engages the second side portion of the member sidewall.

4. The locking assembly of claim 3, wherein the first projection has a tapered surface facing toward the first side portion of the member sidewall and the second projection has a tapered surface facing toward the second side portion of the member sidewall, and the portion of the outside guard surface partially defining the first hollow portion is adjacent to the tapered surface of the first projection and the portion of the outside guard surface partially defining the second hollow portion is adjacent to the tapered surface of the second projection.

5. The locking assembly of claim 1, wherein the cam is configured such that when pivoted toward the locked position, the cam exerts a biasing force on the movable engagement member, the movable engagement member including a mechanical fuse configured to receive the biasing force exerted by the cam and to deform in response thereto if the biasing force exceeds a predetermined amount of force.

6. The locking assembly of claim 1, wherein the cam is configured such that when pivoted into the locked position, the cam exerts a biasing force on the movable engagement member, and the movable engagement member comprises:
 a guard member having an interior cavity with first and second hollow portions, each partially defined by an outside guard surface positioned for locking engagement with the first and second side portions of the member sidewall; and
 a force distribution member nested inside the interior cavity of the guard member, the force distribution member having laterally spaced apart first and second projections extending toward the member, the first projection being received inside the first hollow portion of the guard member and the second projection being received inside the second hollow portion of the guard member; and
 a mechanical fuse positioned and configured to receive the biasing force exerted by the cam when the cam is pivoted toward the locked position, to translate at least a portion of the biasing force to the force distribution member, and to deform in response to the biasing force if the biasing force exceeds a predetermined amount of force, the force translated to the force distribution member being sufficient to move the force distribution member and the guard member in which nested toward the member sidewall and bias a portion of the outside guard surface partially defining the first hollow portion into locking engagement with the first side portion of the member sidewall, and a portion of the outside guard surface partially defining the second hollow portion into locking engagement with the second side portion of the member sidewall.

7. The locking assembly of claim 6, wherein the force distribution member includes first and second support portions with a cavity therebetween, and the mechanical fuse engages the first and second support portions and extends over the cavity, the cavity being sized to provide sufficient space into which the mechanical fuse may deform in response to the biasing force if the biasing force exceeds a predetermined amount of force.

8. The locking assembly of claim 7, wherein the guard member includes a plurality of fingers that each terminate in a tab engaging the mechanical fuse to thereby maintain the force distribution member inside the interior cavity of the guard member.

9. The locking assembly of claim 1, wherein the cam is configured such that when pivoted into the locked position, the cam exerts a biasing force on the movable engagement member, and the movable engagement member comprises:
 a force distribution member having laterally spaced apart first and second projections extending toward the member and positioned adjacent to the second end portion of the member sidewall, the first projection being configured to engage a portion of the first side portion of the member sidewall located toward the second end portion of the member sidewall and the second projection being configured to engage a portion of the second side portion of the member sidewall located toward the second end portion of the member sidewall; and
 a mechanical fuse positioned and configured to receive the biasing force exerted by the cam when the cam is pivoted toward the locked position, to translate at least a portion of the biasing force to the force distribution member, and to deform in response to the biasing force if the biasing force exceeds a predetermined amount of force, the force translated to the force distribution member being sufficient to move the force distribution member toward the member sidewall and bias the first and second projections into locking engagement with the portions of the first and second side portions of the member sidewall located toward the second end portion of the member sidewall, thereby locking the member within the collar and preventing its sliding along the predetermined sliding path.

10. The locking assembly of claim 9, wherein the force distribution member includes first and second support portions with a cavity therebetween, and the mechanical fuse engages the first and second support portions and extends over the cavity, the cavity being sized to provide sufficient space into which the mechanical fuse may deform in response to the biasing force if the biasing force exceeds a predetermined amount of force.

11. The locking assembly of claim 1, wherein the first and second engagement members comprise first and second spaced apart end portions of an elongated wear plate.

12. The locking assembly of claim 11, wherein the wear plate includes at least one tab configured to attach the wear plate inside the interior channel of the collar.

13. The locking assembly of claim 9, wherein the wear plate is constructed from plastic coated with or impregnated by Teflon or molybnum sulfide.

14. The locking assembly of claim 1, wherein the cam is pivotally coupled to the collar by an eccentric pivot pin configured to adjust the position of the cam relative to the member slidably received inside the interior channel of the collar.

15. A locking assembly comprising:
a collar comprising a sidewall defining an interior channel and a housing formed in the sidewall, the housing having a proximal open end and a distal open end spaced therefrom, the proximal open end of the housing of the collar being adjacent to and in communication with the interior channel;
an elongated member positioned inside the interior channel of the collar and longitudinally movable within the interior channel;
a first engagement member disposed inside the interior channel of the collar along a first portion of the sidewall opposing the housing and configured to engage a first portion of the elongated member inside the interior channel;
a second engagement member disposed inside the interior channel of the collar along a second portion of the sidewall opposing the housing spaced apart from the first engagement member and configured to engage a second portion of the elongated member inside the interior channel longitudinally spaced apart from the first portion of the elongated member;
a handle having a grip portion and a cam coupled thereto, the cam being rotatably mounted inside the housing and the grip portion exiting the housing through the distal open end thereof, the grip portion being configured for selective pivotal movement of the cam between a locked position and an unlocked position; and
a cam follower assembly positioned adjacent to the cam and having a third engagement member extending through the proximal open end of the housing and configured to engage a third portion of the elongated member inside the interior channel at a longitudinal location between the first and second portions of the elongated member inside the interior channel on a side of the elongated member away from the first and second portions, when the cam is moved to the locked position the third engagement member is moved inward so as to apply an inward force on the third portion of the elongated member which is transmitted by the first and second portions of the elongated member to the first and second engagement members, respectively, to thereby lock the elongated member against longitudinal movement within the interior channel, and when the cam is moved to the unlocked position a sufficient amount of the inward force is removed to permit longitudinal movement of the elongated member within the interior channel.

16. The locking assembly of claim 15, wherein the third engagement member includes:
a contact member having first and second hollow portions, each partially defined by an outside contact surface positioned for engagement with the third portion of the elongated member inside the interior channel; and
a force distribution member having laterally spaced apart first and second projections extending toward the elongated member, the first projection being received inside the first hollow portion of the contact member and the second projection being received inside the second hollow portion of the contact member such that when the cam is moved to the locked position a portion of the outside contact surface of the first hollow portion and a portion of the outside contact surface of the second hollow portion engage the third portion of the elongated member at laterally spaced apart locations.

17. The locking assembly of claim 16, wherein the first projection has a tapered surface facing laterally inward toward the third portion of the elongated member and the second projection, and the second projection has a tapered surface facing inward toward the third portion of the elongated member and the first projection, and the portion of the outside contact surface of the first hollow portion is adjacent to the tapered surface of the first projection and the portion of the outside contact surface of the second hollow portion is adjacent to the tapered surface of the second projection.

18. The locking assembly of claim 16, wherein the cam is configured such that when the cam is moved toward the locked position, the cam exerts a biasing force on the third engagement member, the third engagement member including a mechanical fuse configured to receive the biasing force exerted by the cam and to deform in response thereto if the biasing force exceeds a predetermined amount of force.

19. The locking assembly of claim 18, wherein the contact member includes a portion extending at least partially over the mechanical fuse to retain the mechanical fuse in position relative to the force distribution member.

20. The locking assembly of claim 15, wherein the cam is configured such that when the cam is moved toward the locked position, the cam exerts a biasing force on the third engagement member, the third engagement member including a mechanical fuse configured to receive the biasing force exerted by the cam and to deform in response thereto if the biasing force exceeds a predetermined amount of force.

* * * * *